(12) United States Patent
Kumar

(10) Patent No.: US 9,383,905 B1
(45) Date of Patent: Jul. 5, 2016

(54) NAVIGATING A LARGE TREE STRUCTURE USING SUMMARY SNIPPETS

(71) Applicant: Symantec Corporation, Mountain View, CA (US)

(72) Inventor: Krishna Kumar, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 243 days.

(21) Appl. No.: 13/953,416

(22) Filed: Jul. 29, 2013

(51) Int. Cl.
*G06F 3/048* (2013.01)
*G06F 3/0484* (2013.01)
*G06F 3/0485* (2013.01)
*G06F 3/0481* (2013.01)
*G06F 3/0486* (2013.01)
G06F 17/30 (2006.01)
G06F 1/16 (2006.01)

(52) U.S. Cl.
CPC ............ *G06F 3/04845* (2013.01); *G06F 3/048* (2013.01); *G06F 3/0481* (2013.01); *G06F 3/0485* (2013.01); *G06F 3/0486* (2013.01); *G06F 3/04842* (2013.01); *G06F 3/04847* (2013.01); *G06F 1/1692* (2013.01); *G06F 17/30126* (2013.01); *G06F 17/30327* (2013.01); *G06F 17/30625* (2013.01); *G06F 17/30961* (2013.01); *G06F 2203/04806* (2013.01)

(58) Field of Classification Search
CPC ................... G06F 3/0485; G06F 2203/04806; G06F 3/048; G06F 3/04842; G06F 3/04845; G06F 3/0481; G06F 17/30126; G06F 3/0486; G06F 3/04847; G06F 1/1692; G06F 17/30327; G06F 17/30625; G06F 17/30961
See application file for complete search history.

(56) References Cited

U.S. PATENT DOCUMENTS

| | | | |
|---|---|---|---|
| 2004/0205536 A1* | 10/2004 | Newman et al. | 715/509 |
| 2008/0115065 A1* | 5/2008 | Bjorg | 715/745 |
| 2009/0063517 A1* | 3/2009 | Wright et al. | 707/100 |
| 2011/0179390 A1* | 7/2011 | Morris | 715/854 |

\* cited by examiner

*Primary Examiner* — William Bashore
*Assistant Examiner* — James F Sugent
(74) *Attorney, Agent, or Firm* — Campbell Stephenson LLP

(57) ABSTRACT

Summary information is used to navigate a tree structure of hierarchically arranged levels of nodes. A user interface displays detailed information concerning the nodes of one or more levels, including the current focus. The interface also displays summary information concerning each level of the navigation path from the root level to the focus level. The user can navigate through the tree structure using the summary information. As the user navigates down into the tree structure, new summary information is displayed summarizing the nodes of each successively deeper level. As the user navigates from the current focus towards the root, the user interface is updated to remove displayed summary and detailed information for levels that are no longer part of the navigation path. The summary information can also be used to filter the detailed information displayed concerning nodes of a specific level, responsive to user specified filtering criteria.

18 Claims, 13 Drawing Sheets

Table 401

| | ID | Status | | Job Type | Policy Name | Job Size | Transfer Rate (KBps) | Deduplication Rate | % Complete |
|---|---|---|---|---|---|---|---|---|---|
| ☐ | A | Done (Success) | ✖ | 48 Backup | <policy_name> | 500 MB 10 files | Average: N | Average: N % | 100% |
| ☐ | B | Stopped | ⬤ | 48 Backup | <policy_name> | 100MB 3 files | Average: N | Average: N % | 80% |

403 — Summary Information 301 — 305 Detailed Information

| | ID | Status | | Job Type | Policy Name | Job Size | Transfer Rate (KBps) | Deduplication Rate | % Complete |
|---|---|---|---|---|---|---|---|---|---|
| ☐ | BA | Running | ✖ | 48 Backup | <policy_name> | 100 MB 2 files | Average: N | Average: N % | 100% |
| ☐ | BB | Stopped | ⚠ | 48 Backup | <policy_name> | 100 MB 3 files | Average: N | Average: N % | 70% |
| ☐ | BC | Done (Failed) | ✖ | 8 Backup | <policy_name> | 200 MB 2 files | Average: N | Average: N % | 100% |
| ☐ | BD | Error | ⬤ | 48 Backup | <policy_name> | 100 MB 3 files | Average: N | Average: N % | 25% |
| ☐ | BE | Done (Failed) | ✖ | 8 Backup | <policy_name> | 200 MB 2 files | Average: N | Average: N % | 100% |
| ☐ | C | Done (Success) | ✖ | 48 Backup | <policy_name> | 100 MB 2 files | Average: N | Average: N % | 100% |
| ☐ | D | Done (Failed) | ✖ | 48 Backup | <policy_name> | 100 MB 3 files | Average: N | Average: N % | 100% |
| ☐ | E | Error | ⬤ | 8 Backup | <policy_name> | 200 MB 2 files | Average: N | Average: N % | 12% |

305 Detailed Information

| | ID | Status | Job Type | Policy Name | Job Size | Transfer Rate (KBps) | Deduplication Rate | % Complete |
|---|---|---|---|---|---|---|---|---|
| | | | | | Summary Information 301 | | | |
| | A | Done (Success) | 48 Backup | <policy_name> | 500 MB 10 files | Average: N | Average: N % | 100% |
| | B | Stopped | 48 Backup | <policy_name> | 100 MB 3 files | Average: N | Average: N % | 80% |
| | C | Done (Success) | 48 Backup | <policy_name> | 100 MB 2 files | Average: N | Average: N % | 100% |
| | D | Done (Failed) | 48 Backup | <policy_name> | 100 MB 3 files | Average: N | Average: N % | 100% |
| | E | Error | 8 Backup | <policy_name> | 200 MB 2 files | Average: N | Average: N % | 12% |

Table 401

403

Level 1
Status
5  2 1 0 1 1

Table 401

| | ID | Status | Job Type | Policy Name | Job Size | Transfer Rate (KBps) | Deduplication Rate | % Complete |
|---|---|---|---|---|---|---|---|---|
| ☐ ✖ | A | Done (success) | 48 Backup | <policy_name> | 500 MB 10 files | Average: N | Average: N % | 100% |
| ☐ ⊘ | B | Stopped | 48 Backup | <policy_name> | 100 MB 3 files | Average: N | Average: N % | 80% |
| | | | | Level 1 Statuses ✖ ✖ ✦ ● ◐ 5 2 1 0 1 1 | | Level 2 Statuses ✖ ✖ ✦ ● ◐ 5 0 2 1 1 1 | Summary Information 301 | |
| ☐ ✖ | BA | Running | 48 Backup | <policy_name> | 100 MB 2 files | Average: N | Average: N % | 100% |
| ☐ ● | BB | Stopped | 48 Backup | <policy_name> | 100 MB 3 files | Average: N | Average: N % | 70% |
| ☐ ✦ | BC | Done (failed) | 8 Backup | <policy_name> | 200 MB 2 files | Average: N | Average: N % | 100% |
| ☐ ● | BD | Error | 48 Backup | <policy_name> | 100 MB 3 files | Average: N | Average: N % | 25% |
| ☐ ✦ | BE | Done (failed) | 8 Backup | <policy_name> | 200 MB 2 files | Average: N | Average: N % | 100% |
| ☐ ✖ | C | Done (success) | 48 Backup | <policy_name> | 100 MB 2 files | Average: N | Average: N % | 100% |
| ☐ ✦ | D | Done (failed) | 48 Backup | <policy_name> | 100 MB 3 files | Average: N | Average: N % | 100% |
| ☐ ● | E | Error | 8 Backup | <policy_name> | 200 MB 2 files | Average: N | Average: N % | 12% |

503 (repeated markers), 403

| | ID | Status | Job Type | Policy Name | Job Size | Transfer Rate (KBps) | Deduplication Rate | % Complete |
|---|---|---|---|---|---|---|---|---|
| 503 | A | Done (Success) | 48 Backup | <policy_name> | 500 MB 10 files | Average: N | Average: N % | 100% |
| 503 | B | Stopped | 48 Backup | <policy_name> | 100MB 3 files | Average: N | Average: N % | 80% |
| 503 | BA | Running | 48 Backup | <policy_name> | 100 MB 2 files | Average: N | Average: N % | 100% |
| 503 | BB | Stopped | 48 Backup | <policy_name> | 100 MB 3 files | Average: N | Average: N % | 70% |
| 503 | BBA | Done (Failed) | 8 Backup | <policy_name> | 200 MB 2 files | Average: N | Average: N % | 100% |
| 503 | BBB | Done (Success) | 48 Backup | <policy_name> | 100 MB 3 files | Average: N | Average: N % | 100% |
| 503 | BBC | Stopped | 8 Backup | <policy_name> | 200 MB 2 files | Average: N | Average: N % | 60% |
| 503 | BBD | Done (Success) | 48 Backup | <policy_name> | 100 MB 2 files | Average: N | Average: N % | 100% |
| 503 | BBE | Error | 48 Backup | <policy_name> | 100 MB 3 files | Average: N | Average: N % | 50% |
| 503 | BC | Done (Failed) | 8 Backup | <policy_name> | 200 MB 2 files | Average: N | Average: N % | 100% |
| 503 | BD | Error | 48 Backup | <policy_name> | 100 MB 3 files | Average: N | Average: N % | 25% |
| 503 | BE | Done (Failed) | 48 Backup | <policy_name> | 200 MB 2 files | Average: N | Average: N % | 100% |
| 503 | C | Done (Success) | 48 Backup | <policy_name> | 100 MB 3 files | Average: N | Average: N % | 100% |
| 503 | D | Done (Failed) | 48 Backup | <policy_name> | 100 MB 2 files | Average: N | Average: N % | 100% |
| 503 | E | Error | 8 Backup | <policy_name> | 200 MB 2 files | Average: N | Average: N % | 12% |

Table 401

Summary Information 301

Fig. 5C

| Table 401 | | | | | | | | | |
|---|---|---|---|---|---|---|---|---|---|
| | ID | Status | Job Type | Policy Name | Job Size | Transfer Rate (KBps) | Deduplication Rate | % Complete |
| 503 | A | Done (Success) | 48 Backup | <policy_name> | 500 MB 10 files | Average: N | Average: N % | 100% |
| 503 | B | Stopped | 48 Backup | <policy_name> | 100MB 3 files | Average: N | Average: N % | 80% |
| 503 | BA | Running | 48 Backup | <policy_name> | 100 MB 2 files | Average: N | Average: N % | 100% |
| 503 | BB | Stopped | 48 Backup | <policy_name> | 100 MB 3 files | Average: N | Average: N % | 70% |
| 503 | BBA | Done (Failed) | 8 Backup | <policy_name> | 200 MB 2 files | Average: N | Average: N % | 100% |
| 503 | BBB | Done (Success) | 48 Backup | <policy_name> | 100 MB 3 files | Average: N | Average: N % | 100% |
| 503 | BBC | Stopped | 8 Backup | <policy_name> | 200 MB 2 files | Average: N | Average: N % | 50% |
| 503 | BBCA | Done (Success) | 48 Backup | <policy_name> | 100 MB 2 files | Average: N | Average: N % | 100% |
| 503 | BBCB | Stopped | 48 Backup | <policy_name> | 100 MB 3 files | Average: N | Average: N % | 50% |
| 503 | BBCC | Done (Failed) | 8 Backup | <policy_name> | 200 MB 2 files | Average: N | Average: N % | 100% |
| 503 | BBCD | Done (Success) | 48 Backup | <policy_name> | 100 MB 3 files | Average: N | Average: N % | 40% |
| 503 | BBCE | Error | 8 Backup | <policy_name> | 200 MB 2 files | Average: N | Average: N % | 100% |
| 503 | BBD | Done (Success) | 48 Backup | <policy_name> | 100 MB 3 files | Average: N | Average: N % | 50% |
| 503 | BBE | Error | 48 Backup | <policy_name> | 200 MB 2 files | Average: N | Average: N % | 100% |
| 503 | BC | Done (Failed) | 48 Backup | <policy_name> | 200 MB 3 files | Average: N | Average: N % | 25% |
| 503 | BD | Error | 48 Backup | <policy_name> | 200 MB 2 files | Average: N | Average: N % | 100% |
| 503 | BE | Done (Failed) | 8 Backup | <policy_name> | 200 MB 2 files | Average: N | Average: N % | 100% |
| 503 | C | Done (Success) | 48 Backup | <policy_name> | 100 MB 2 files | Average: N | Average: N % | 100% |

Summary Information 301

| | ID | Status | Job Type | Policy Name | Job Size | Transfer Rate (KBps) | Deduplication Rate | % Complete |
|---|---|---|---|---|---|---|---|---|
| | | | | | | | Summary Information 301 | |
| □ | A | Done (Success) | 48 Backup | <policy_name> | 500 MB 10 files | Average: N | Average: N % | 100% |
| □ | B | Stopped | 48 Backup | <policy_name> | 100MB 3 files | Average: N | Average: N % | 80% |
| □ | BA | Running | 48 Backup | <policy_name> | 100 MB 2 files | Average: N | Average: N % | 100% |
| □ | BB | Stopped | 48 Backup | <policy_name> | 100MB 3 files | Average: N | Average: N % | 70% |
| □ | BBA | Done (Failed) | 8 Backup | <policy_name> | 200 MB 2 files | Average: N | Average: N % | 100% |
| □ | BBB | Done (Success) | 8 Backup | <policy_name> | 100 MB 3 files | Average: N | Average: N % | 100% |
| □ | BBC | Stopped | 8 Backup | <policy_name> | 200 MB 2 files | Average: N | Average: N % | 60% |
| □ | BBD | Done (Success) | 48 Backup | <policy_name> | 100 MB 2 files | Average: N | Average: N % | 100% |
| □ | BBE | Error | 48 Backup | <policy_name> | 100 MB 3 files | Average: N | Average: N % | 50% |
| □ | BC | Done (Failed) | 8 Backup | <policy_name> | 200 MB 2 files | Average: N | Average: N % | 100% |
| □ | BD | Error | 8 Backup | <policy_name> | 100 MB 3 files | Average: N | Average: N % | 25% |
| □ | BE | Done (Failed) | 8 Backup | <policy_name> | 200 MB 2 files | Average: N | Average: N % | 100% |
| □ | C | Done (Success) | 48 Backup | <policy_name> | 100 MB 2 files | Average: N | Average: N % | 100% |
| □ | D | Done (Failed) | 48 Backup | <policy_name> | 100 MB 3 files | Average: N | Average: N % | 12% |
| □ | E | Error | 8 Backup | <policy_name> | 200 MB 2 files | Average: N | Average: N % | |

Table 401

NAVIGATING A LARGE TREE STRUCTURE USING SUMMARY SNIPPETS

TECHNICAL FIELD

This disclosure pertains generally to computer implemented data navigation and content filtering, and more specifically to using summary information to navigate a broad and/or deep tree data structure.

BACKGROUND

A tree structure is a way of representing hierarchically organized information in a graphical form. The term "tree structure" refers to the resemblance of such a representation to a tree, although the graph is generally inverted compared to an actual tree, with the "root" at the top and the "leaves" at the bottom. In computer science, a tree is often used as a hierarchical data structure, with a root node and multiple generations of nested child nodes, represented as a tree of linked nodes. In this context, a tree structure can be thought of as a collection of nodes (starting at a root node), where each node typically consists of a value (data), a list of references to its child nodes (if any), and a reference to its parent-node (only the root node has no parent). Tree hierarchies can be used to represent, store and/or navigate any type of hierarchically arranged data.

Graphical navigation tools for tree hierarchies are useful, but when a tree has many (e.g., thousands) of levels and/or nodes per level, the user can easily lose track of the context of the nodes being viewed within the tree as a whole. Because the viewable area of even a very large screen is not sufficient to display the whole tree at once, users are typically restricted to seeing a subset of the nodes, including the nodes at the level that is currently being examined (the nodes at this level can be said to be "in focus" or to "have the focus" or to be the "focus" level). With information only being displayed for the nodes at the level "in focus" and typically a few adjacent levels depending upon available screen space, the user tends to lose track of the relationship of the nodes at the focus level to those nodes and levels of the tree that are not currently depicted on the screen. Although some tools provide summary information at the top most level, when the tree is sufficiently deep and/or a current level has a sufficient number of nodes, the context is still lost, since the user can only see the nodes which are currently displayed on the screen.

It would be desirable to address these issues.

SUMMARY

A tree structure summary system is configured for using summary information to navigate a tree structure, which comprises a plurality of hierarchically arranged levels of nodes. For at least one level of the tree structure, a user interface on the screen of a user operated computer displays a collection of detailed information concerning nodes of the level. One specific level for which detailed information is displayed is identified by the user interface as the focus level.

The user interface also displays summary information concerning each level of the navigation path from the root level to the focus level of the tree structure. This summary information indicates the hierarchical relationship between the levels of the navigation path, contains less data than the corresponding displayed per-level collections of detailed information, and is displayed in less screen space.

The user can navigate through the tree structure, for example by selecting a specific node (via either the summary information or the detailed information). This sets the focus level to the level of the selected node's children. As the focus level changes as a result of the user navigating within the tree, the displayed summary information is updated such that new levels are summarized, and the new focus level is identified, thereby keeping the displayed summarization of the navigation path from the root to the focus current. The displayed collections of detailed information are also updated to show the current focus level, and (to the extent screen size permits) its ancestor levels going back up the navigation path to the root.

The detailed information for the focus level can be displayed centrally on the user interface, framed by the detailed information concerning its ancestor levels. More specifically, the detailed information for the nodes of each displayed parent level through the anchor point to its child level are displayed above the child level, and the nodes of each displayed parent after the anchor point are displayed below. Because the detailed information takes more screen space to display than the summary information, the detailed information can be truncated due to lack of available screen space. However, the displayed summary information still informs the user of the context of the current focus level within the tree structure as a whole. The summary information can be displayed in different places relative to the detailed information, such as in a horizontal row above the detailed information concerning the focus level.

The summary information can be displayed as a plurality of user interface summarization components, with a separate component for each level in the navigation path, each component containing information summarizing the nodes of the given level such as, for example, the number of nodes in the level and their current status. As the user navigates down into the tree structure from the root level to successively deeper levels, for each successive level to which the user navigates, a new user interface summarization component is displayed summarizing the nodes of the given successive level. As the user navigates from the focus level back towards the root level, the user interface is updated to reflect the current focus level, and summarization components and collections of detailed information concerning levels that are no longer part of the navigation path are removed from the user interface.

The summary information can be used to filter the detailed information displayed concerning nodes of a specific level, responsive to the user specifying filtering criteria. For example, the user can specify filtering criteria by making selections on the user interface summarization component concerning the specific level. In response, the detailed information for the level is updated, such that only nodes that meet the filtering criteria are displayed. In addition, users can elect to skip to specific levels of the navigation path that are hierarchically more than one level above the focus level in the tree structure. More specifically, the summary information for such levels includes a user interface component for skipping to the given level. Responsive to the user activating a displayed component for skipping to a specific level, the user interface removes any displayed collection of detailed information for any level of the navigation path between the specific skipped-to level and the focus level. The summary information is still displayed for skipped levels, so that the user continues to have access to the entire navigation path. The summary information for a skipped level adds a user interface component for reinstating its display. Responsive to the user activating the component for reinstating a specific skipped level, the user interface displays the collection of detailed information concerning the skipped level once again.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 4 is a diagram of a user interface of a tree structure summary system, according to some embodiments.

FIGS. 5A-5I illustrate an example of a user interface during the operation of a tree structure summary system, according to some embodiments.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
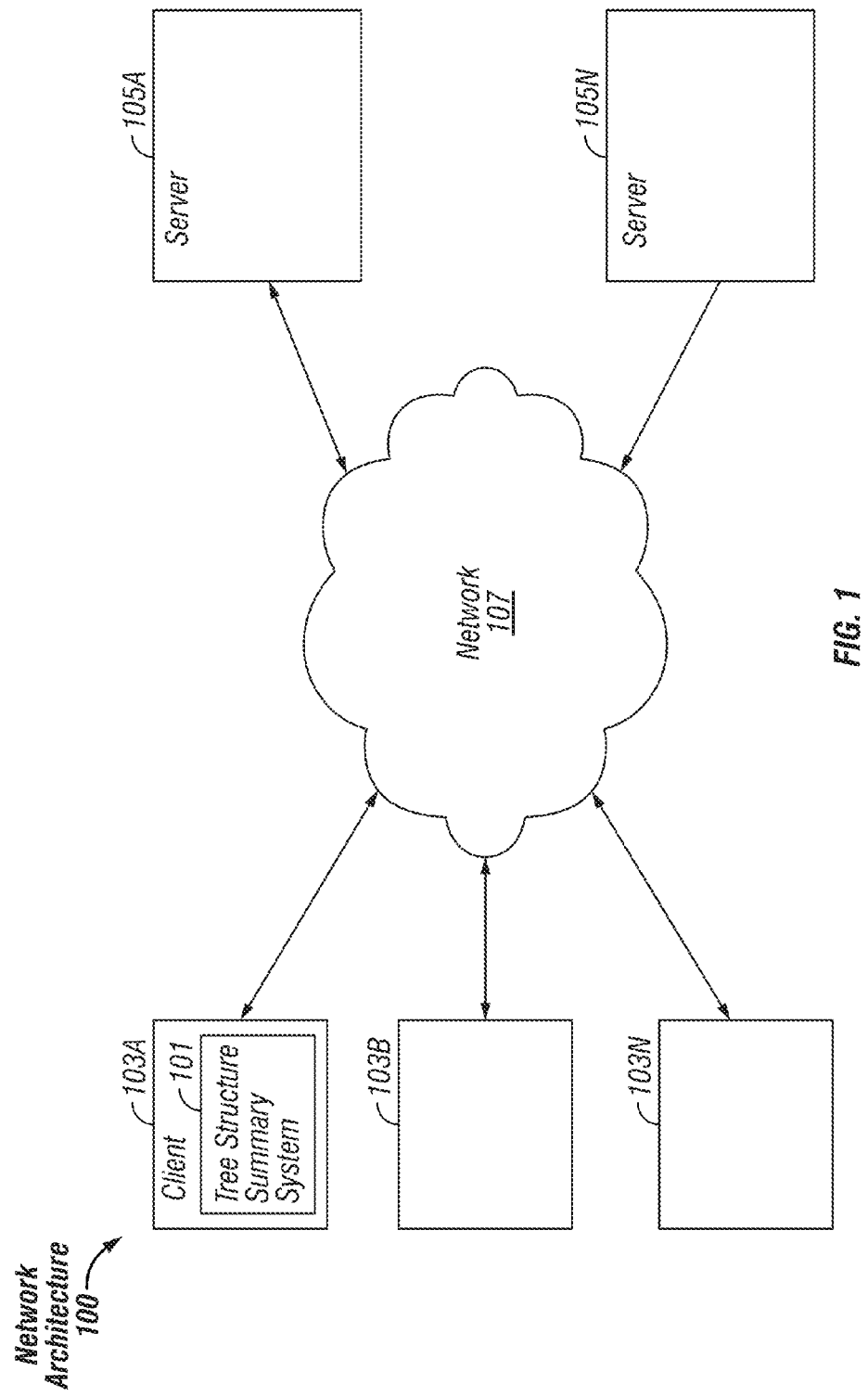
FIG. 1 is a block diagram of an exemplary network architecture in which a tree structure summary system can be implemented, according to some embodiments.

FIG. 1 is a block diagram illustrating an exemplary network architecture 100 in which a tree structure summary system 101 can be implemented. The illustrated network architecture 100 comprises multiple clients 103A, 103B and 103N, as well as multiple servers 105A and 105N. In FIG. 1, a tree structure summary system 101 is illustrated as residing on client 103A. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can be in the form of desktop/laptop computers, or mobile computing devices, comprising portable computer systems capable of connecting to a network 107 and running applications. Such mobile computing devices are sometimes referred to as smartphones, although many mobile phones not so designated also have these capabilities. Tablet computers are another example of mobile computing devices.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
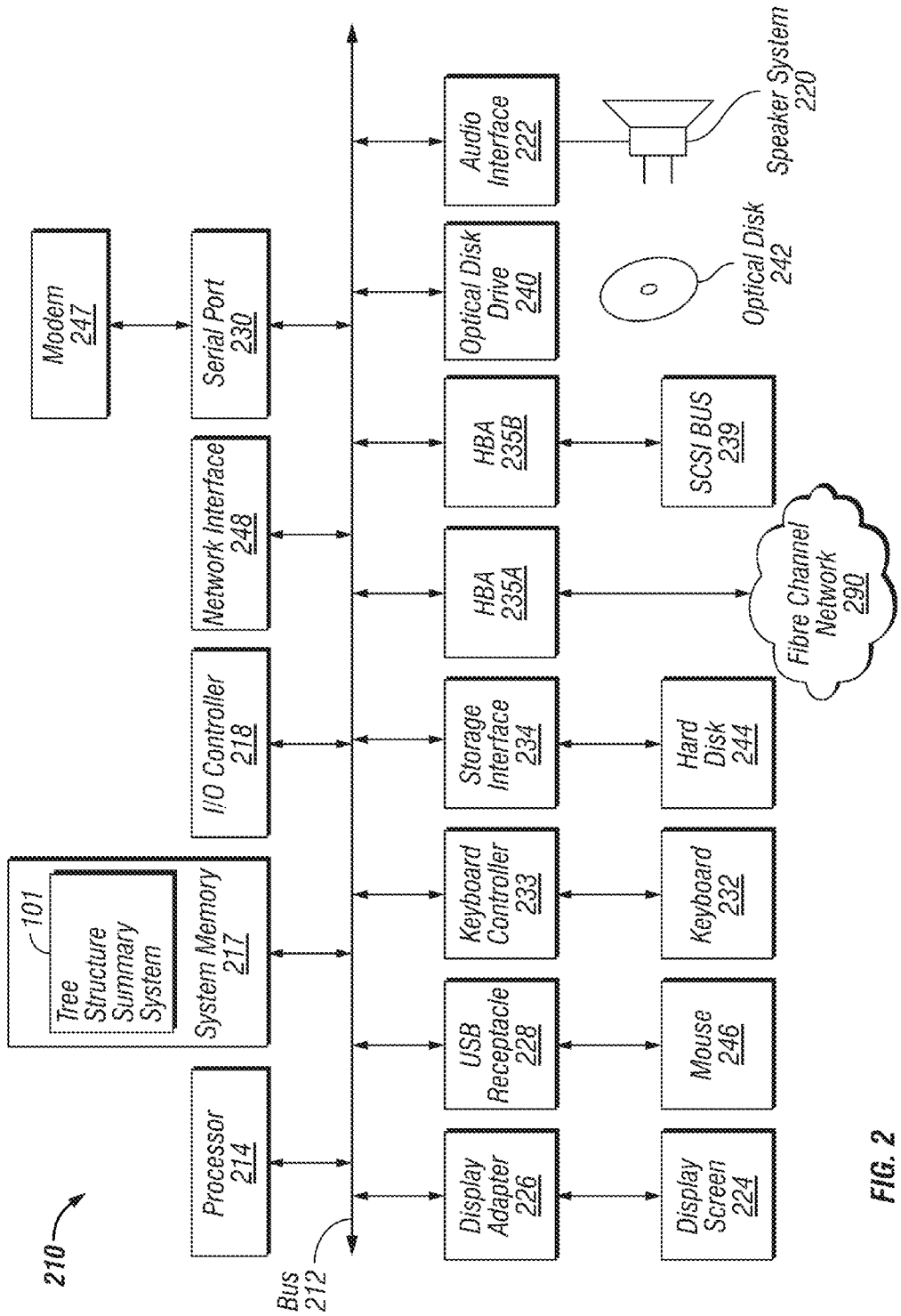
FIG. 2 is a block diagram of a computer system suitable for implementing a tree structure summary system, according to some embodiments.

FIG. 2 is a block diagram of a computer system 210 suitable for implementing a tree structure summary system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker 220, a display adapter 226 communicatively coupled to an external video output device such as a display screen 224, one or more interfaces such as Universal Serial Bus (USB) receptacles 228, serial ports 230, parallel ports (not illustrated), etc., a keyboard controller 233 communicatively coupled to a keyboard 232, a storage interface 234 communicatively coupled to at least one hard disk 244 (or other form(s) of magnetic media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212 e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB receptacles 228). The various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the tree structure summary system 101 is illustrated as residing in system memory 217. The workings of the tree structure summary system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
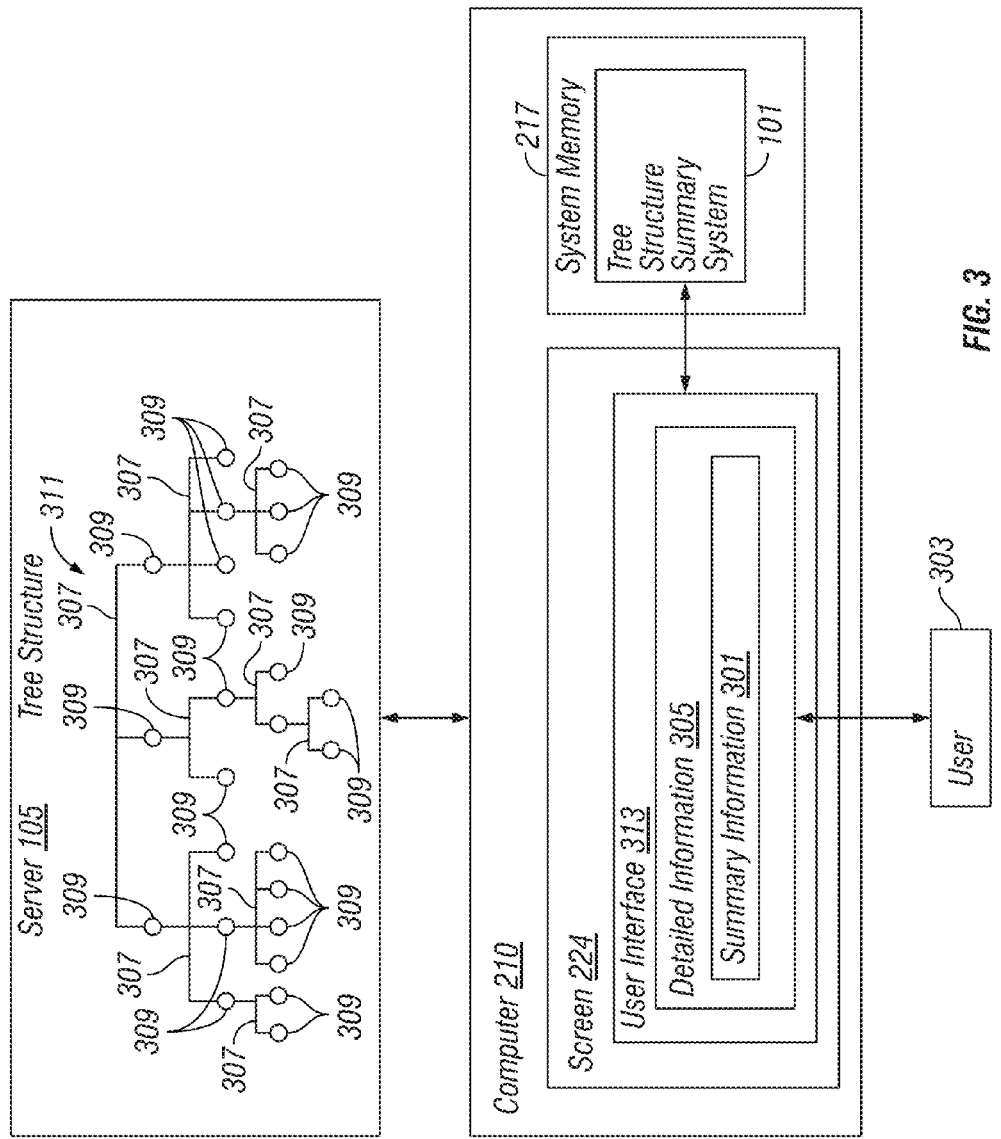
FIG. 3 is a block diagram of the operation of a tree structure summary system, according to some embodiments.

FIG. 3 illustrates the operation of a tree structure summary system 101, according to some embodiments. As described above, the functionalities of the tree structure summary system 101 can reside on a client 103, a server 105, or be distributed between multiple computer systems 210, including within a cloud-based computing environment in which the functionality of the tree structure summary system 101 is provided as a service over a network 107. It is to be understood that although the tree structure summary system 101 is illustrated in FIG. 3 as a single entity, the illustrated tree structure summary system 101 represents a collection of functionalities, which can be instantiated as a single or multiple modules as desired (an instantiation of specific, multiple modules of the tree structure summary system 101 is illustrated in FIG. 3). It is to be understood that the modules of the tree structure summary system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the tree structure summary system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, the tree structure summary system 101 displays tree structure summary information 301 that enables a user 303 to navigate between levels 307 and nodes 309 of a hierarchical tree structure 311, without losing track of the context of the section of the tree structure 311 that is currently in focus. The tree structure summary system 101 also provides the user 303 with a filtering mechanism, which allows the user 303 to narrow (or expand) the criteria of the nodes 309 that s/he is interested in viewing. Additionally, the user 303 can utilize the tree structure summary system 101 to collapse or expand displayed levels 307 between the root and level of focus. Thus, the tree structure summary system 101 results in highly efficient navigation and filtering of a tree structure 311, while allowing the user 303 to always keep track of the context of a section of the tree structure 311 currently in focus, even where the tree 311 is deep and/or wide enough that only a relatively small subset of its levels 307 and/or nodes 309 at a given level 307 can be depicted on the screen 224 at one time.

In FIG. 3, a tree structure 311 comprising multiple levels 307 of nodes 309 is illustrated as residing on a server 105. It is to be understood that the tree structure 311 on the server 105 comprises actual content organized hierarchically in a manner corresponding to the graphical representation thereof displayed by the user interface 313. For illustrative clarity, only a small number of levels 307 and nodes 309 are illustrated in FIG. 3, whereas a tree structure 311 in practice would typically be much larger. Although FIG. 3 shows the tree structure 311 residing on a single server 105 for illustrative clarity, in practice the content of a tree structure 311 can be distributed between multiple computers 210 and storage devices as desired. It is to be understood that the content which is organized according to the tree structure 311 varies between embodiments according to use case. Some examples of specific use cases are a file system made up of hierarchically organized directories and files, a collection of running software processes (e.g., jobs in backup system) that are organized hierarchically, a database of hierarchically organized records concerning, e.g., members of an organization, items in an inventory, successive versions of authored works, etc.

The tree structure summary system 101 outputs a user interface (e.g., a GUI) 313 on a user operated computer (e.g., the client 103 illustrated in FIG. 3). The user interface 313 graphically depicts at least a section of the tree structure 311, and allows the user 303 to navigate through its levels 307, and perform actions on its nodes 309 (e.g., view, access, edit, delete, etc.). The specific actions the user 303 can perform depends upon the content and configuration of the specific tree structure 311.

Turning to FIG. 4, a high level example of a user interface 313 on a display screen 224 is illustrated according to one embodiment. It is to be understood that FIG. 4 depicts one example of a user interface 313 according to one embodiment of the tree structure summary system 101. The exact look and feel of a user interface 313 that provides the features described herein can vary between embodiments as desired. Note that FIGS. 5A-5I illustrate an example of a user interface 313 in greater detail.

In the embodiment illustrated in FIG. 4, the largest area of the screen 224 is utilized by the user interface 313 to show levels 307 and nodes 309 of a subset of the tree structure 311 at a greater level than the summary information 301, which is discussed in more detail below. This area of the user interface 313 in which the more detailed information 305 is depicted is referred to herein as the table 401. What specific information to display per node 309 in the table 401 varies between embodiments, but typically a substantive amount of information is shown, at a level of detail sufficient to allow the user 303 to work with the nodes 309 in the manner customary for the type of tree structure 311 in question (e.g., access and edit data records, view and control job status, interact with file system objects, etc.). For example, information such as name, id, status, type, size, content, and/or various statistics, depending upon the embodiment and content and type of the specific tree structure 311. The detailed information 305 displayed in the table 401 can be thought of as per-level collections of information concerning the nodes 307 of the given level 307.

A specific level 307 is displayed on the user interface 313 as the focus level $307_{focus}$. In one embodiment, when the tree structure summary system 101 is initialized to interact with a given tree structure 311, the user interface 313 displays the root level 307 in focus by default. In other embodiments, other levels 307 are shown as the focus by default at initialization, such as, for example, the level 307 which was in focus when the given user 303 last exited the tree structure summary system 101. When a given node 309 is selected through the interface 313, the focus changes to the level 307 of the children of the selected node 309, and the nodes 309 at the parent level 307 (i.e., the level 307 of the selected node 309) are shown in the table 401, but out of the focus (e.g., above and below the depiction of the focus, as screen 224 space permits). The term "level" 307 of a tree structure 311 is used herein in its ordinary and customary meaning in the art of computer science, in order to mean the nodes 309 at the root of the tree structure 311 (the root level $307_{root}$), or the nodes 309 that are the children of a given node 309 at a higher level 307. As the user 303 navigates through the tree structure 311 and nodes 309 at successively lower levels 307 come into focus, this processes can continue to any level of nesting based on the depth of the tree structure 311. At any point in this process, the level $307_{focus}$ that is currently in focus (i.e., the level 307 with which the user 303 is actively working) is depicted in the table 401, as well as a limited number of ancestor levels 307, based on the amount of available screen 224 space. In one embodiment, the level 307 immediately above the focus level $307_{focus}$ is depicted in the table 401 with the first node 309 of that level 307 through the node 309 of which the focus level $307_{focus}$ is a child above the focus, and those nodes 309 after the node 309 of which the focus is a child below. Successively higher levels 307 are then depicted above and below the node 309 anchoring them to the level 307 below, as screen 224 space permits. This user interface 313 configuration is depicted in greater detail in FIGS. 5A-5I.

Because screen 224 space is limited, there is often not enough room in the table 401 to show the levels 307 going back from the focus to the root (note that a working tree structure 311 can easily be thousands of levels 307 deep). It can also be the case that there is not enough screen 224 space to show all of the nodes 309 at a given level 307 (e.g., the level 307 in focus), as levels 307 can also be hundreds of nodes 309 wide. Therefore, in order to enable the user 303 to keep track of the context of the focus within the tree structure 311 as a whole, the user interface 313 also displays summary information 301.

Initially, when the root level $307_{root}$ of the tree 311 has the focus, summary information 301 concerning the root level $307_{root}$ is displayed. When the user 303 changes the focus (i.e., by selecting a specific node 309 and thereby changing the focus to the level 307 of its children), the summary information 301 is expanded to summarize the nodes 309 at the new (now current) focus level $307_{focus}$, and to show the relationship between the current focus level $307_{focus}$ and the parent node 309 that was selected to change the focus thereto. This can be continued to any level of nesting through the tree structure 311. Note also that when the focus level 307 is moved up towards the root, the summary information 301 is also updated accordingly. Therefore, summary information 301 of the full path from the root level $307_{root}$ to the current focus level $307_{focus}$ is displayed, thereby providing the context information between the two that can otherwise be lost.

The exact format, content and screen 224 placement of the summary information 301 varies between embodiments. The depiction of the summary information 301 by the user interface 313 can be divided into user interface summarization components which are referred to herein as snippets 403, with one snippet 403 summarizing the nodes 309 of a given level 307, such that the summary information 301 is depicted by as many snippets 403 as there are levels 307 from the root to the focus. The relationships between levels 307 can be depicted by the relative placement of the snippets 403 (e.g., running from left to right across the screen 224 horizontally as the levels move from root to focus as show in FIG. 4) and/or by arrows (as per FIG. 4) or other graphical indicia indicating the hierarchical relationship between levels. What information concerning the summarized level 307 and its nodes 307 to include in a snippet 403 can vary between embodiments. Summary snippets 403 are illustrated in greater detail in FIGS. 5A-5I.

Generally, the snippets 403 of summary information 301 are compact in size and sparse in content relative to the more detailed information 305 shown in the table 401. Examples of the type of information in a summary snippet 403 are the level number, the number of nodes in the level (total or at the selected branch), and a consolidated summary of the status of the nodes 309 at the level 307. What information to include in consolidated status depends on the content of the nodes 309 in the table 311. Status information can be in the form of, for example, specific numbers of nodes 309 at the level 307 that have specific statuses (e.g., done, running, failed, locked, etc.) or are of specific types (read-only, read-write, executable, protected, etc.), a given percentage of nodes 309 that are greater or less than a specific size. etc. In some embodiments, graphical indicia or textual labels are used to represent status or type. In some embodiments, a snippet 403 includes an entry (e.g., a status indicator) for each node 309 in the summarized level 307, whereas in others the level 307 is summarized with less detail. In some embodiments, each snippet 403 at a level 307 above the focus includes an indication (e.g., a graphical indicia) of which node 309 in that level was selected to change the focus to the child level 307 (i.e., the level 307 of the selected node's children). The node 309 selected to change the focus can be thought of as the anchor point between levels 307.

As the user 303 navigates into the tree structure 311 from the root to successively deeper levels 309, the summary information 301 is expanded as the focus changes, by adding a new summary snippet 403 for each successive level 307. If the user's navigates up a level 307 from the focus back towards the root, the summary information is collapsed accordingly, by removing the summary snippet 403 that is no longer part of the navigation path. Thus, a summary snippet 403 is displayed for each level 307 from the root to the current focus. Therefore, the context of the current focus level $307_{focus}$ is presented to the user 303. The collection of the summary snippets 401 clearly indicates the navigation path from the root to the focus level $307_{focus}$. The user 303 thus always has the context in view, even while navigating deep into the tree 311, which is not possible in a conventional tree interface, due to the limitations in available screen 224 space.

FIG. 4 illustrates the user interface 313 displaying the summary snippets 403 in a horizontal row within the table 401, above the level of focus 307. In another embodiment, the summary snippets 403 are displayed elsewhere in the user interface 313, such as outside of the table 401 (e.g., above or below it). Displaying the summary information along the horizontal axis is suitable for use in embodiments in which the screen 224 which is wider than it is high. In other embodiments, summary snippets 403 are displayed in a vertical column, e.g., to the left or the right of the table 401, for example on a tablet device in portrait mode. In some embodiments, the summary information 301 can be displayed in multiple rows and/or columns.

Not only do the summary snippets 403 provide the user 303 with the context of the current focus in relation to the tree structure 311 as a whole, but the snippets 403 themselves enable the user 303 to navigate between nodes 309 and levels 307 of the tree structure 311 quickly and efficiently. In one embodiment, when the user 303 selects the component on a given summary snippet 403 representing a specific node 309 (e.g., the user clicks on or otherwise activates a graphical indicia or textual label in the snippet 403 corresponding to the given node 309), the tree structure summary system 101 changes the focus to the children of the selected node 309, and updates the user interface accordingly as described above. Thus, the user 303 can navigate through the tree structure 311 by selecting nodes 309 at given levels 307 in the summary information 301. In some embodiments, the user 303 changes the focus by selecting nodes 309 in the detailed information 305 section of the table 401 instead of or in addition to the summary information 301. Either way, because the summary information 301 graphically depicts the path from root to focus, the user 303 can navigate efficiently, with the context clearly displayed by the navigation tool. This is a great advantage over a conventional tree structure interface, which requires the user 303 to navigate between levels with an incomplete picture of the nesting context, where the complete navigation path is beyond what can be accommodated on the screen 224.

In addition to using the summary information 301 to navigate through the tree structure 311, the user 303 can utilize the summarized information 301 as a basis from which to quickly narrow (or expand) the items that are shown in the table 401 in detail. Over time, a user 303 is typically interested in seeing detailed information 305 concerning different nodes 309 according to different criteria, depending upon the nature of the work the user 303 is currently doing. With the summary information of the nodes 309 at each level 307 from the root to the focus clearly displayed, the user 303 is empowered to make informed decisions quickly as to criteria to utilize to narrow what nodes 309 are displayed in the table 401. For example, the user may wish to only see nodes 309 that have a given status (e.g., completed successfully, running, caused an error, are of a requisite size or type, etc.). The specific criteria which are available to the user 303 to filter the nodes 309 is typically a function of the content and type of the tree structure 311, and accordingly varies between embodiments.

Relevant summary criteria are displayed in the snippets 403 for given levels 307 (e.g., the summary information 301 shows the user 303 statistics such as how many nodes 309 have given characteristics at various levels 307). Thus, the user 303 can readily refer to this information 301, and efficiently make filtering decisions. In response to the user 303 entering criteria to be used as a basis to filter (e.g., by clicking on corresponding components in the summary snippets 403 or the detailed information 305 section of the table 401, or by otherwise entering filtering criteria through the user interface 313), the interface 313 automatically updates its display of detailed information 305 in the table 401 accordingly. Thus, the user 303 can utilize the summary information 301 to reduce displayed nodes 309 to a relevant few. Note that the user can filter the output to be displayed without actually changing the level 307 of the focus, e.g., by directing the user interface 313 to only display nodes 309 in the current focus meeting certain criteria, such as having a given status. Filtering is described in greater detail in conjunction FIGS. 5A-5I below.

Another way in which summary information 301 can be used is to limit which levels 307 between the root and the focus are shown in the detailed information 305 section of the table 401, where such a limitation adds to the clarity of view. Recall that the table 401 shows levels 307 above the level 307 of focus, going up the navigation path towards the root. Depending upon the width and number of the levels 307 between the focus and the root, the limitations of the screen 224 space may only allow the display of detailed information 305 for a small percentage of these levels 307 in the table 401. By default the levels 307 displayed are those immediately above the focus in the navigation path, as permitted by available screen 224 space. In some instances, depending upon the work the user 303 is doing, it may be desirable to collapse the display of detailed information 305 concerning certain intermediate levels in the table 401, and instead display detailed information 305 concerning one or more higher levels 307, which are currently not visible in the table 401 due to limited screen 224 space. Because the summary information 301 displays a snippet 403 for each level 307 in the navigation path, the user 303 can make informed decisions based on the summary information 301 about which levels 307 to collapse in the table 401 (i.e., to which level 307 to skip).

To enable this feature, the tree structure summary system 101 provides a user interface component (e.g., a graphical item such as an arrow or a textual label) as part of each summary snippet 403 that corresponds to a level 309 to which the user 303 can skip. (As is described in greater detail below, some levels 309 such as the current focus are not valid targets for skipping operations, and thus their summary snippets 403 lack this component.) Responsive to the user 303 selecting (e.g., clicking on or otherwise activating) this component for a given level 307, the tree structure summary system 101 updates the user interface 313 to display the level 307 to which the user skipped directly above the focus in the table 401. To do so, the table 401 is updated to eliminate the display of the detailed information 305 in the table 401 for the skipped levels 307 (i.e., the levels 307 between the focus and the level 307 to which the user 303 skipped). The summary information 301 still displays snippets 403 for the skipped levels 307, so the user 303 can still see the full navigation path.

When the skipping of levels 307 occurs, the tree structure summary system 101 displays a user interface component in the summary snippet 403 for each level 307 which was skipped, indicating that the level 307 was skipped and offering the option of reinstituting it in the detailed information 305 section of the table 401. Responsive to the user 303 selecting this component, the tree structure summary system 101 updates the user interface 313 to once again display the skipped level. Thus, skipping to a given level 307 collapses the display of detailed information 305 for the intermediate level(s) 307 between the focus and skip target, and reinstating a skipped level expands the display to once again show the previously skipped level 307. Note that skipping or reinstating levels 307 does not change the focus, only which intermediate levels 307 are displayed between the root and the focus. The Figures herein show a double arrow pointing up 501 as an example of a user interface component to skip to that level 307, and a double arrow pointing down 505 as an example of a user interface component to expand a skipped level 307. However, these are simply examples, and in other embodiments other graphical indicia or textual labels are used as desired. The level skipping feature is described and illustrated in greater detail below in conjunction with FIGS. 5A-5I.

In addition to the level skipping feature, in some embodiments some of the summary information 301 is collapsed, for example if the number of levels 307 being summarized becomes great enough that there is not ample room on the screen 224 to display all of the corresponding summary snippets 403 and the table 401. Summary information 301 can be collapsed in response to factors such as the summary information 301 occupying more than a requisite percentage of the screen 224, more than a requisite number of levels being summarized, etc. The requisite percentages and numbers to use in such instances are design parameters that can vary between embodiments. To collapse summary information 401, less information can be displayed in some or all snippets 403 (e.g., just show the number of nodes 309 in the level 307 and an identifier of the anchor point, as opposed to status information and the like for each node 309).

FIGS. 5A-5I illustrate screen shots showing an example of the user interface 313 as the tree structure summary system 101 performs above-described functionality, according to one embodiment. The specific contents and layout of the user interface 313 including the summary information 301, summary snippets 403 and detailed information 305 in the table 401 depicted in FIGS. 5A-5I are examples only, according to one embodiment. The same is true for the content and arrangement of the tree structure 311 depicted in FIGS. 5A-5I. In other embodiments, the content, layout, arrangement and look of these items varies. In the example embodiment of FIGS. 5A-5I, the nodes 309 of the tree structure 311 are in the form of hierarchically arranged jobs in a backup system.

FIG. 5A shows the user interface 313 after the tree structure summary system 101 is initially activated. By default, the root level 307$_{root}$ (level 1) of the tree structure 311 is the focus, and no other levels 307 are displayed. There are five nodes 309 in the root level 307$_{root}$, nodes A-E, with one row in the table 401 for each node 309. The detailed information 305 for each node 309 shown in the table 401 comprises ID (a sequential letter identifying the node 309), status, job type, policy name, job size, transfer rate, deduplication rate and percent complete. For each node, the table 401 also includes an expand (or contract) component 505 (represented as an addition (or subtraction) sign in a box) and a graphical indicator representing the status for each node 309 depicted. The summary information 301 is displayed in the table 401 above the detailed information 305 for the root level 307$_{root}$, and includes a single summary snippet 403, which summarizes the root level 307$_{root}$. The summary snippet 403 identifies the level 307 it is summarizing (level 1), the number of nodes 309 in that level 307 (5), and a graphical indicator for each possible status, with the number of nodes 309 in that level 307 that have the given status (2, 1, 0, 1 and 1).

FIG. 5B shows the user interface 313 after the user 303 has selected the expand component 505 for node B of the root level 307$_{root}$. The focus is now level 2, which is the level 307 of the child nodes 309 of node B (nodes BA, BB, BC, BD and BE). The detailed information 305 in the table 401 is expanded to show the nodes 509 of level 2, which is now the focus level 307$_{focus}$, below the anchor point to the parent level 307 (node B of the root level 307$_{root}$) and above the nodes of the parent level 307 after the anchor point (nodes C-E of the root level 307$_{root}$). A new summary snippet 403 is displayed in the summary information 301, summarizing level 2. The summary snippet 403 for level 1 now depicts the anchor point between levels 1 and 2 (node B), with an arrow indicating the direction of the parentage relationship between the levels 307 (i.e., level 1 is the parent of level 2, which is also indicated by the placement of the corresponding summary snippets 403 from left to right in the summary information 301).

FIG. 5C shows the user interface 313 after the user 303 has selected the expand component 505 for node BB of level 2. The focus is now level 3, which is the level 307 of the child nodes 309 of node BB (nodes BBA, BBB, BBC, BBD and BBE). The detailed information 305 in the table 401 is expanded to show the nodes 509 of the new focus level 307$_{focus}$ below the anchor point to the parent level 307 (node BB of level 2), and above the nodes of the parent level 307 after the anchor point (nodes BC-BE of the level 2). The detailed information 305 in the table 401 also still shows level 1, outside (above and below) level 2. A new summary snippet 403 is displayed in the summary information 301, summarizing level 3, and the summary snippet 403 for level is updated to depict the anchor point between levels 2 and 3.

Figure 5E:
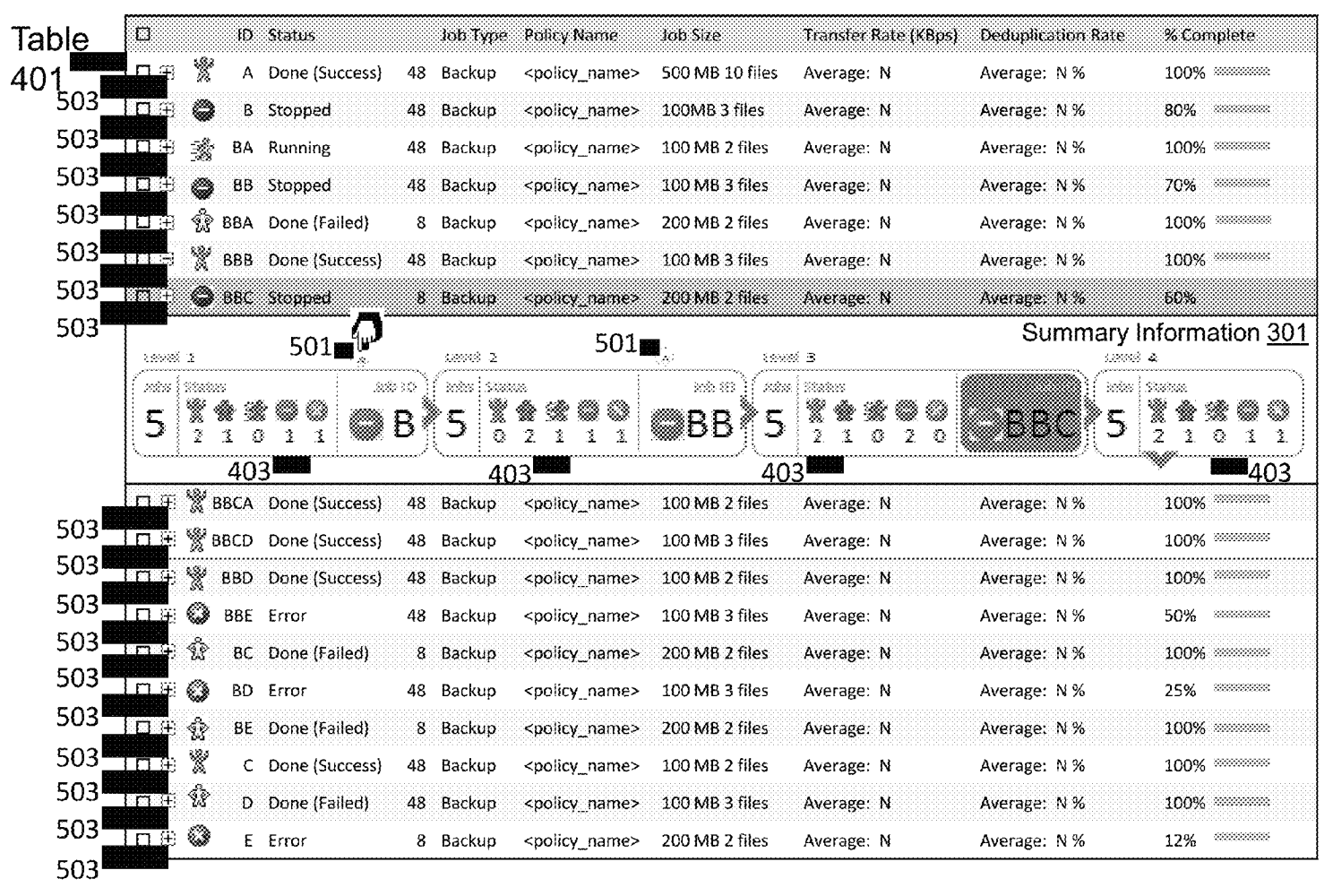
Figure 5F:
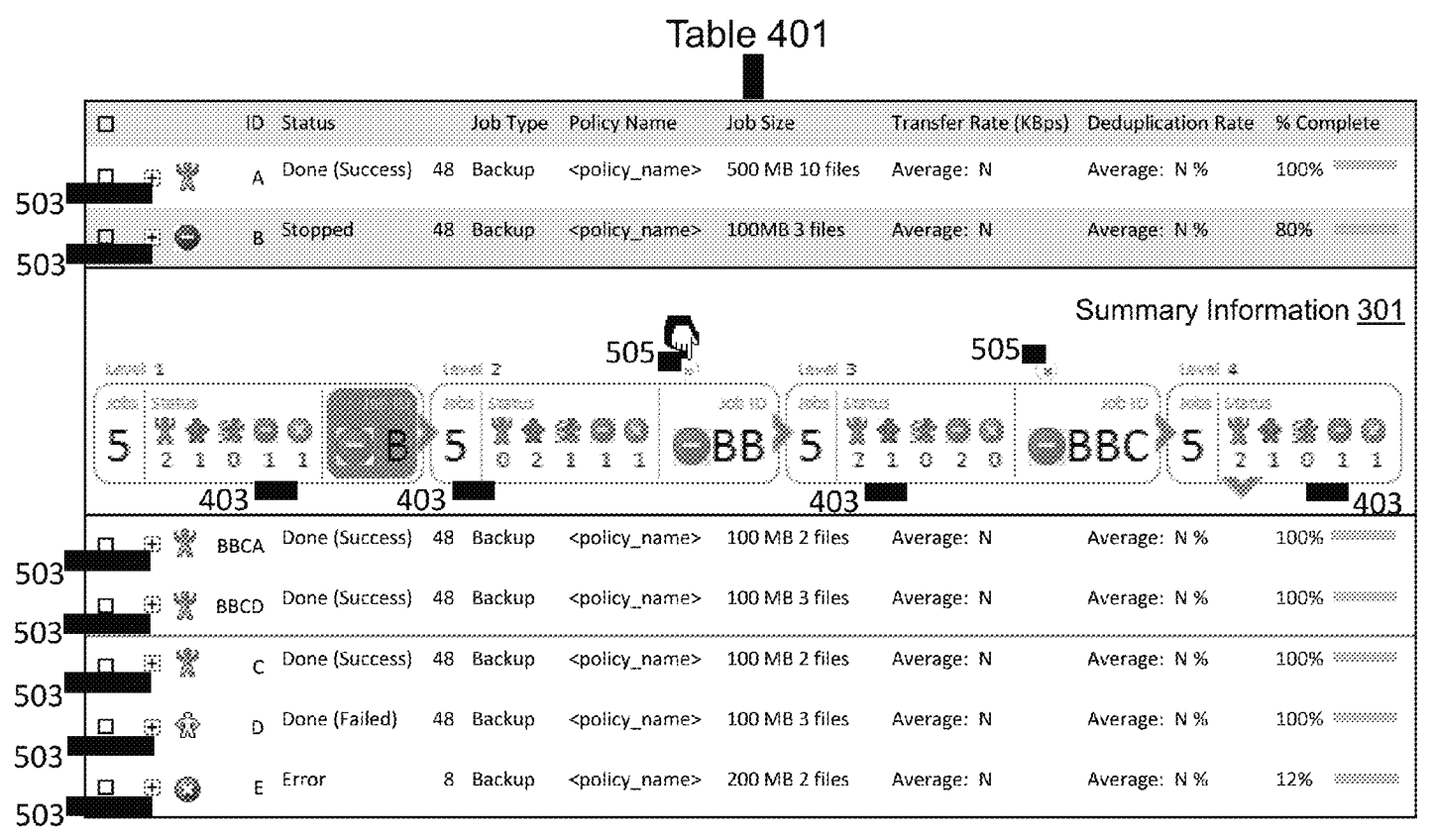
Figure 5G:
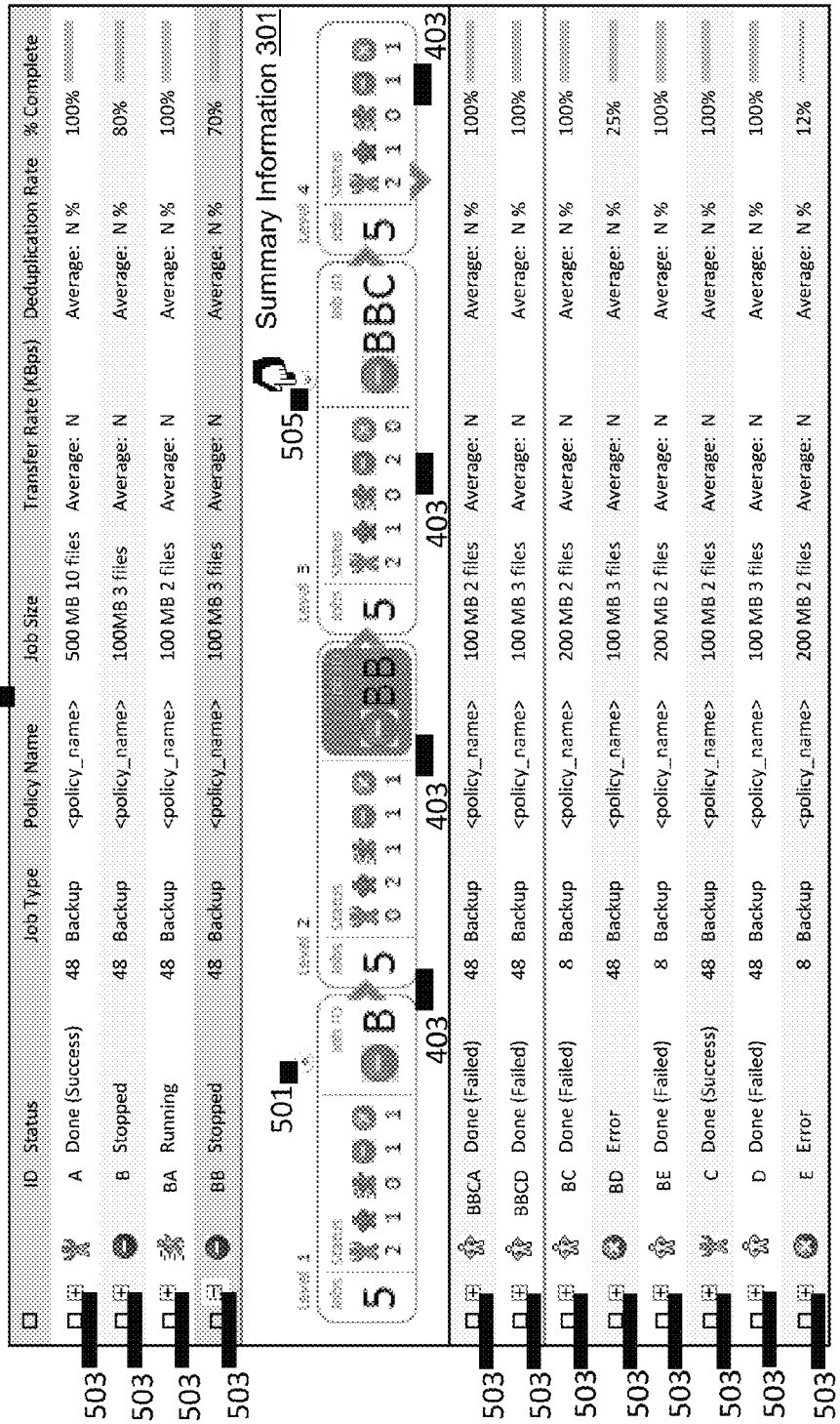

Note that in FIG. 5C, the summary snippet for level 1 now includes a double arrow pointing up 501, which is the user interface component in this embodiment to activate upwards level skipping. No upwards level skipping component 501 is depicted in FIG. 5A, because when only a single level 307 is displayed, there is no level 307 to skip to, and thus the feature is not available. Likewise, in FIG. 5B no upwards level skipping components 501 are displayed because only the focus and root are depicted, and thus there are no intermediate levels 307 to skip. For the same reason, no level skipping component 501 is displayed for the focus level 307$_{focus}$ or its immediate parent in FIGS. 5C-I.

FIG. 5D shows the user interface 313 after the user 303 has selected the expand component 505 for node BBC of level 3. The focus is now level 4, the level 307 of the child nodes 309 of selected node BBC. The detailed information 305 in the table 401 now shows level 4 as the new focus, and still shows levels 3 and 2 outside of levels 4 and 3 respectively. Note that due to the limited available space on the screen 224, only part of level 1 is displayed (the bottom of the table 401 is cut off after node C). A new summary snippet 403 is displayed in the summary information 301 corresponding to level 4, the summary snippet 403 for level 3 is updated to depict the anchor point, and the summary snippet for level 2 is updated to add an upwards level skipping component 501, as it is now possible to skip to level 2.

FIG. 5E shows the user interface 313 after the user 303 has filtered the nodes 309 to be displayed in the focus level 307, by clicking on the number in the corresponding summary snippet 403 below the graphical indicator for nodes 309 with the status of successful (the graphic of a person with arms up in the air). By taking this action, the user is indicating to filter out nodes 309 in this level 307 with other statuses. Thus, the detailed information 305 in the table 401 for level 4 now only shows the two nodes 309 in that level 307 with the status of successful (nodes BBCA and BBCD). Note that the summary snippet 303 for level 4 still summarizes all five nodes 309 in the level 307, but the downward single arrow is moved from under the total number of nodes 309 to the number with the selected status, thereby reflecting the filtering. It is to be understood that this is just an example of the type of filtering operation that can be performed by the tree structure summary system 101.

FIG. 5F shows the user interface 313 after the user 303 has activated the upwards level skipping component 501 for level 1, indicating to skip to level 1 (i.e., to collapse the detailed display in the table 401 of all levels 307 between the focus and level 1). Thus, the detailed information 305 in the table 401 now depicts level 1 directly outside of level 4, having collapsed the display of levels 2 and 3. Note that the summary snippets 403 for levels 2 and 3 are still present, showing the full navigation path. The summary snippets 403 for levels 2 and 3 have been updated to display double arrows pointing down 505, which in this embodiment are user interface component to reinstate a skipped level 307.

Figure 5H:
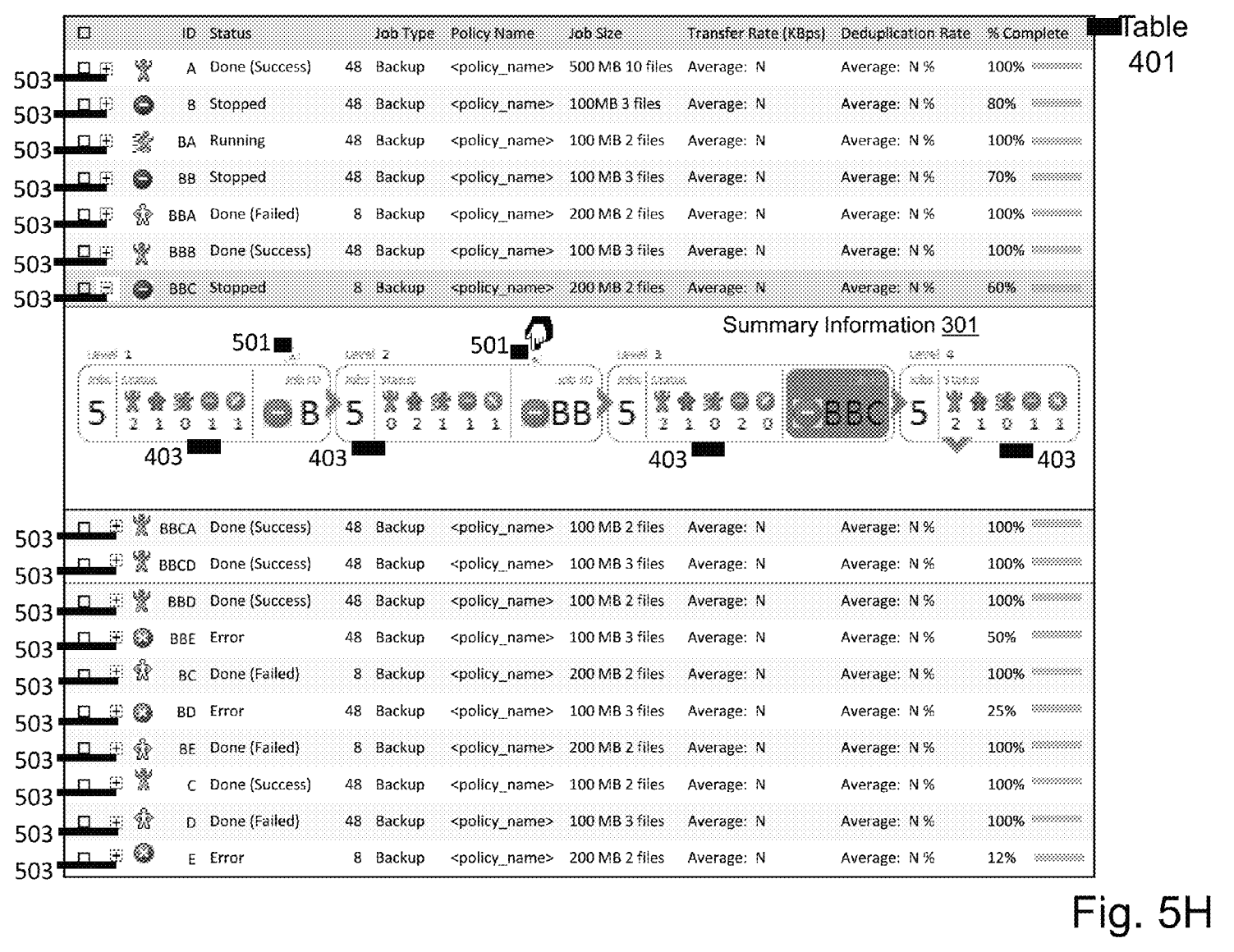

FIG. 5G shows the user interface 313 after the user 303 has activated the downwards level skipping component 505 for level 2, indicating to expand skipped level 2. Thus, the detailed information 305 in the table 401 now depicts level 2 directly outside of level 4, with level 1 outside of level 2. Level 3 is still collapsed. Likewise, FIG. 5H shows the user interface 313 after the user 303 has activated the downwards level skipping component 505 for level 3, indicating to expand skipped level 3. Thus, the detailed information 305 in the table 401 now depicts level 3 outside of level 4, level 2 outside of level 3, and level 1 outside of level 2, with no collapsed levels 307.

Finally, FIG. 5I shows the user interface 313 after the user 303 has changed the focus through the summary snippets 403, by clicking on node BB in the summary snippet 403 for level 2 (node BB is shown therein as the anchor point). This has the effect of changing the focus from level 4 to the level 307 of the children of node BB, which is level 3. Thus, both the detailed information 305 in the table 401 and the summary information 301 are updated to eliminate level 4, and display level 3 as the focus.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for navigating a tree structure, the tree structure comprising a plurality of levels of nodes arranged hierarchically, each level comprising at least one node, with a root level atop the tree structure, the method comprising the steps of:
    displaying, for at least one level of the tree structure, an associated collection of information concerning nodes of the at least one level, by a user interface on a screen of a user operated computer;
    identifying one specific level concerning which the associated collection of information is being displayed as being a focus level, by the user interface on the screen of the user operated computer;
    displaying summary information concerning each level of a navigation path from the root level to the focus level of the tree structure, by the user interface on the screen of the user operated computer, wherein the summary information indicates a hierarchical relationship between the levels of the navigation path from the root level to the focus level of the tree structure, the summary information concerning a particular level contains less data than a corresponding displayed collection of information concerning the particular level, and is displayed in less screen space than the corresponding collection of information concerning the particular level,
    the summary information concerning each level of the navigation path from the root level to the focus level of the tree structure comprises a user interface summarization component summarizing nodes of the given level, separate user interface summarization components are displayed for each separate level of the navigation path from the root level to the focus level, and the user interface summarization component summarizing nodes of the given level further includes
        a number of nodes of the given level, and
        graphical status information concerning each node of the given level;
    in response to the user selecting a specific node of the focus level, wherein the specific node has a child level comprising at least one child node, changing focus from the level of the specific node to the child level, whereby the child level becomes the focus level;
    updating the summary information associated to each level of the navigation path from the root level to the focus level, by the user interface on the screen of the user operated computer, wherein the updated summary information further comprises summary information concerning the child level, indicating that the child level comprises the focus level; and
    displaying the associated collection of information concerning the nodes of the child level, by the user interface on the screen of the user operated computer, wherein the associated collection of information concerning the nodes of the child level indicates that the child level comprises the focus level.

2. The method of claim 1 wherein the displaying the information concerning the nodes of the at least one level of the tree structure further comprises:
    displaying the associated collection of information concerning nodes of the focus level, by the user interface on the screen of the user operated computer, and
    displaying the associated collection of information concerning nodes of at least one ancestor level of the focus level, by the user interface on the screen of the user operated computer,
    wherein nodes of each displayed parent level through an anchor point to its child level are displayed above the display of its child level and nodes of each displayed parent level after the anchor point to its child level are displayed below its child level.

3. The method of claim 1, further comprising:
    in response to the user navigating to a level above the focus level in the tree structure, setting the level to which the user has navigated as a new focus level;
    removing displayed summary information concerning any level below the new focus level in the tree structure, by the user interface on the screen of the user operated computer; and
    removing any associated displayed collection of information concerning any level below the new focus level in the tree structure, by the user interface on the screen of the user operated computer.

4. The method of claim 1, wherein the displaying specific information concerning the nodes of the at least one level of the tree structure further comprises:
    truncating displayed information concerning at least one level of the tree structure due to a limitation in size of the screen of the user operated computer.

5. The method of claim 1, further comprising:
    as the user navigates into the tree structure from the root level to successively deeper levels, for each successive level to which the user navigates,
    displaying a new user interface summarization component summarizing nodes of the given successive level.

6. The method of claim 1, further compromising:
    as the user navigates from the focus level back towards the root level, updating a current focus level and removing displayed user interface summarization components summarizing nodes of each level that is no longer part of the navigation path from the root level to the current focus level.

7. The method of claim 1, further comprising:
    displaying the user interface summarization components in a horizontal row above the displayed collection of information concerning the focus level, by the user interface on the screen of the user operated computer.

8. The method of claim 1, wherein the changing the focus level from the level of the specific node to the child level in response to the user selecting the specific node of the focus level further comprises:
    detecting that the user has selected the node of the focus level via the user interface summarization component concerning the focus level.

9. The method of claim 1, further comprising:
    filtering information displayed in the associated collection of information concerning nodes of a specific level, responsive to the user specifying filtering criteria.

10. The method of claim 9, further comprising:
updating the displayed associated collection of information concerning the specific level, wherein the updated displayed collection of information concerns only nodes that meet the filtering criteria.

11. The method of claim 9 further comprising:
detecting that the user has specified the filtering criteria by operating a user interface summarization component concerning the specific level.

12. The method of claim 1, further comprising:
in the summary information concerning each specific level of the navigation path that is hierarchically more than one level above the focus level in the tree structure, displaying a user interface component for skipping to the given level of the navigation path; and
responsive to the user activating the displayed user interface component for skipping to a specific level of the navigation path, removing any displayed associated collection of information concerning any level of the navigation path between a specific skipped-to level and the focus level, by the user interface on the screen of the user operated computer.

13. The method of claim 12 wherein the displaying the summary information concerning each level of the navigation path from the root level to the focus level of the tree structure further comprises:
for any level whose associated collection of information has been removed from the displayed information in response to the user activating the displayed user interface component for skipping to a specific level of the navigation path, displaying the user interface component in the corresponding summary information for reinstating the display of the skipped level; and
responsive to the user activating a displayed user interface component for reinstating the display of a specific skipped level of the navigation path from the root level to the focus level of the tree structure, displaying the associated collection of information concerning the skipped level.

14. The method of claim 1, wherein the displaying the summary information concerning each level of the navigation path from the root level to the focus level of the tree structure further comprises:
truncating at least some summary information, in response to a lack of screen space.

15. The method of claim 1 further comprising:
by default, setting and displaying the root level as the focus level of the tree structure, by the user interface on the screen of the user operated computer.

16. A non-transitory computer readable storage medium storing a computer program product for navigating a tree structure, the tree structure comprising a plurality of levels of nodes arranged hierarchically, each level comprising at least one node, with a root level atop the tree structure, the non-transitory computer readable-storage medium storing computer executable instructions that, when loaded into computer memory and executed by at least one processor of a computing device, cause the computing device to perform the following steps:
displaying, for at least one level of the tree structure, a per-level collection of information concerning nodes of the at least one level, by a user interface on a screen of a user operated computer;
identifying one specific level concerning which the per-level collection of information is being displayed as being a focus level, by the user interface on the screen of the user operated computer;
displaying summary information concerning each level of a navigation path from the root level to the focus level of the tree structure, by the user interface on the screen of the user operated computer, wherein the summary information indicates a hierarchical relationship between the levels of the navigation path, the summary information concerning a particular level contains less data than the corresponding displayed per-level collection of information concerning the particular level, and is displayed in less screen space than the corresponding per-level collection of information concerning the particular level,
the summary information concerning each level of the navigation path from the root level to the focus level of the tree structure comprises a user interface summarization component summarizing nodes of the given level, a separate user interface summarization component is displayed for each separate level of the navigation path from the root level to the focus level, and the user interface summarization component summarizing nodes of the given level further includes
a number of nodes of the given level, and
graphical status information concerning each node of the given level;
in response to the user selecting a specific node of the focus level, wherein the specific node has a child level comprising at least one child node, changing focus from the level of the specific node to the child level, whereby the child level becomes the focus level;
updating the summary information concerning each level of the navigation path from the root level to the focus level, by the user interface on the screen of the user operated computer, wherein the updated summary information further comprises summary information concerning the child level, indicating that the child level comprises the focus level; and
displaying the associated collection of information concerning the nodes of the child level, by the user interface on the screen of the user operated computer, wherein the displayed associated collection of information concerning the nodes of the child level indicates that the child level comprises the focus level.

17. The non-transitory computer readable storage medium of claim 16, further storing computer executable instructions that, when loaded into computer memory and executed by the least one processor cause the computing device to perform the following additional step:
for each level of the navigation path from the root level to the focus level, displaying a user interface summarization component summarizing nodes of the given level, wherein a separate user interface summarization component is displayed for each separate level of the navigation path from the root level to the focus level.

18. A computer system for selecting at least one preferred node for a specific functional role in a cluster, the computer system comprising:
at least one processor;
a system memory;
a display screen; and
a tree structure summary system residing in the system memory, the tree structure summary system being programmed to output a user interface to the display screen, the user interface being programmed to
display, for at least one level of a tree structure, an associated collection of information concerning nodes of the at least one level, identify one specific level concerning which the associated collection of information is being displayed as being a focus level, display summary information concerning each level of a navigation path from a root level of the tree structure to the focus level of the tree structure, wherein the summary information indicates a hierarchical relationship between the levels of the navigation path, the summary information concerning a particular level contains less data than the corresponding displayed associated collection of information concerning the particular level, and is displayed in less screen space than the corresponding associated collection of information concerning the particular level, the summary information concerning each level of the navigation path from the root level to the focus level of the tree structure comprises a user interface summarization component summarizing nodes of the given level, a separate user interface summarization component is displayed for each separate level of the navigation path from the root level to the focus level, and the user interface summarization component summarizing nodes of the given level further includes a number of nodes of the given level, and graphical status information concerning each node of the given level, change focus to a child level, in response to a user selecting a specific node of the focus level, wherein the specific node has a child level comprising at least one child node, whereby the child level becomes the focus level, update the summary information concerning each level of the navigation path from the root level to the focus level, wherein the updated summary information further comprises summary information concerning the child level, indicating that the child level comprises the focus level, and display the associated collection of information concerning the nodes of the child level, wherein the displayed associated collection of information concerning the nodes of the child level indicates that child level comprises the focus level.

\* \* \* \* \*